(12) United States Patent
DeMarcken et al.

(10) Patent No.: US 6,418,413 B2
(45) Date of Patent: Jul. 9, 2002

(54) METHOD AND APPARATUS FOR PROVIDING AVAILABILITY OF AIRLINE SEATS

(75) Inventors: Carl G. DeMarcken, Arlington; Gregory R. Galperin, Boston, both of MA (US)

(73) Assignee: ITA Software, Inc., Cambridge, MA (US)

( * ) Notice: Subject to any disclaimer, the term of this patent is extended or adjusted under 35 U.S.C. 154(b) by 0 days.

(21) Appl. No.: 09/244,905

(22) Filed: Feb. 4, 1999

(51) Int. Cl.[7] .............................................. G06F 17/60
(52) U.S. Cl. ..................... 705/5; 705/6; 705/7; 705/10
(58) Field of Search ............................... 705/5, 6, 7, 10

(56) References Cited

U.S. PATENT DOCUMENTS

| | | | |
|---|---|---|---|
| 5,161,225 A | * 11/1992 | Abraham et al. | 395/600 |
| 5,832,454 A | * 11/1998 | Jafri et al. | 705/6 |
| 5,839,114 A | * 11/1998 | Lynch et al. | 705/5 |
| 5,897,620 A | * 4/1999 | Walker et al. | 705/5 |
| 5,918,209 A | * 6/1999 | Campbell et al. | 705/5 |
| 5,999,946 A | * 12/1999 | Bailis et al. | 707/201 |
| 6,085,169 A | * 7/2000 | Walker et al. | 705/26 |

FOREIGN PATENT DOCUMENTS

WO    WO-00/43927 A2 *  7/2000   ........... G06F/17/60

OTHER PUBLICATIONS

Travelocity.com Launches Fare Search Technology on New Platform. Travelocity.com News Release [online], Jan. 2001 [retrieved on Jan. 22, 2001]. Retrieved from the Internet: <http://www.corporate–ir.net/ireye/ir_site.zhtml?ticker=TVLY&script=410&layout=7&item_id=145745.*
Foley, Sabre's Challenge, Aug. 1997, Information Week, pp. 83–86.*
Feldman, "Chasing the Rational Marketplace", Air Transport World Dec. 1998 vol. 35 Issue 12 P 32, 2P.

* cited by examiner

Primary Examiner—Sam Rimell
Assistant Examiner—Christopher L. Gilligan
(74) Attorney, Agent, or Firm—Fish & Richardson P.C.

(57) ABSTRACT

A computer program product, method and system for producing seat availability information for a mode of travel such as airline travel produce a prediction of availability of a seat in accordance with an availability query. The prediction is used in place of making an actual query to an airline or other travel mode availability system.

27 Claims, 9 Drawing Sheets

METHOD AND APPARATUS FOR PROVIDING AVAILABILITY OF AIRLINE SEATS

BACKGROUND

This invention relates generally to determining airline seat availability information for use in travel planning and travel reservation systems.

Airlines institute selling policies that can change to meet supply and demand considerations to maximize profit on any given flight. When a passenger specifies an itinerary, the itinerary has one or more flight segments. In order to issue a ticket for a single or multi-flight segment itinerary, each flight segment must be available. That is, each flight segment must have seats that have not been already reserved for other passengers. Availability can also be governed by whether an airline will sell to a particular passenger given characteristics of the passenger. Common characteristics which are used by airlines to decide whether or not to sell a ticket is the price that the passenger is willing to pay for the ticket, whether the passenger is using other flights on that airline, whether the passenger is a frequent flyer and so forth.

Generally, before booking a flight and issuing a ticket, the seller can send a request for availability information to the airline. In general, a request for availability is sent over a computer network to an airline and is processed in the airline's computer system. An answer to the request is provided from the system. Commonly, a message is returned to the seller. The message includes one or possibly a plurality of so-called booking codes that are labels used to designate different prices that an airline is willing to sell tickets at. Associated with these booking codes or labels are often a number of seats that the airline is willing to sell in each booking code. For example, a common booking code is the "Y" booking code and the message may contain Y/25 meaning the Y booking code has 25 seats. A second booking code may be the "Q" booking code and may contain a message which says Q/0 meaning that the Q booking code has 0 seats available. Although the exact meaning of booking codes may vary from carrier to carrier, in general most carriers will use Y booking codes corresponding to an expensive coach class fare and a Q booking code as an inexpensive coach class fare. The airline would make the seat at the Y booking code available, i.e., a higher profit booking code, rather than make the seat available at the Q booking code, i.e., a lower profit fare.

SUMMARY

Conventionally, travel agents and computer reservation services look-up a limited number of flight options. Thus, having an airline check on availability for those flights and asking a computer reservation service to perform a fare search for such flights involves a small number of availability checks, low latency and is generally acceptable. However, new algorithms have been produced for performing so-called "large scale" or "low fare searches" that iterate over a large number of flight possibilities and therefore would require looking up availability information and performing fare searches over the flight and available booking codes for many hundreds if not thousands of possible combinations. Since there is a computational expense, as well as an economic expense, involved in obtaining availability information, it is desirable to minimize this expense as much as possible. While it is necessary for good travel planning to look at many possible flight combinations such as hundreds or possibly thousands, it is undesirable to return to a traveler who requested such flight combinations large numbers of flights for which no seats are in fact available. Therefore, the need for availability information is present with a low fare search or large scale search algorithms. However, the current availability infrastructure does not allow for easy access to such queries which could take many minutes and possibly hours at high processing and economic costs.

According to an aspect of the invention, a computer program product residing on a computer readable medium includes instructions for causing a computer to produce a prediction of availability of a seat on an airline flight in accordance with an availability query.

The computer program product provides a prediction of availability by accessing a database of stored query answers to produce a prediction in response to the query. The computer program product can determine whether the availability query corresponds to or is similar to a query stored in the database. The product also retrieves the stored answer associated with a query stored in the database that corresponds to or is similar to availability query or otherwise send an actual availability query to the airline reservation system. The computer program product can use a model based predictor to provide a prediction of the answer to the query if there is no availability query found in the database. The computer program product can parse the availability query to produce a set of features for use by an availability model, determine features of the availability query, and apply selected ones of the determined features of the query to an availability model. The computer program product can simulate an airline's availability system to provide a predicted answer of availability. The computer program product can access a database that has probability estimates stored as a function of booking codes.

According to a further aspect of the invention, a method for providing availability information for a seat on an airline includes producing a prediction of availability of the seat in accordance with an availability query.

According to a still further aspect of the invention, a system for producing an availability answer in response to a query for airline seat availability information includes a predictor that is responsive to the query and produces an answer that corresponds to a prediction of airline seat availability.

The current process provides a technique to substitute predictions of availability for actual availability responses. Availability predictions are based upon several conceptual types of models which can be used separately or in various combinations. These models include a predictor based upon a cache or a database of stored availability queries and answers to the availability queries. The queries are used to identify when a stored query is the same as a received query request, and the answers are used as a substitute for direct access for future identical or substantially related queries.

A second approach uses predictive models of availability that are based upon parametric statistical models that use historical data, as well as, recent queries and may also include deterministic rule based models. In addition, the predicted model and the cache of available queries can be used in combination to improve the overall performance of the availability predictor.

A third approach simulates an airline's availability system or uses a direct connection to an availability process that is run as a local process to a low fare search or large scale search algorithm process. Thus, for example, a computer program is developed that simulates an airline's particular availability system. The program can be developed by using known data or system responses that can be reverse engineered. The simulated availability system can provide predicted answers to availability queries. In addition, airlines can provide their availability software for direct access by the low fare or the large scale search processes.

The availability predictor or the availability system is particularly advantageous to run as a local process to a server that performs travel planning. With such a server that produces a large number of possible flight combinations and associated fares, the availability predictor or availability system can be used to retain those pricing solutions (i.e., itinerary-fare combinations) that have a realistic chance of being available.

DESCRIPTION

Figure 1:
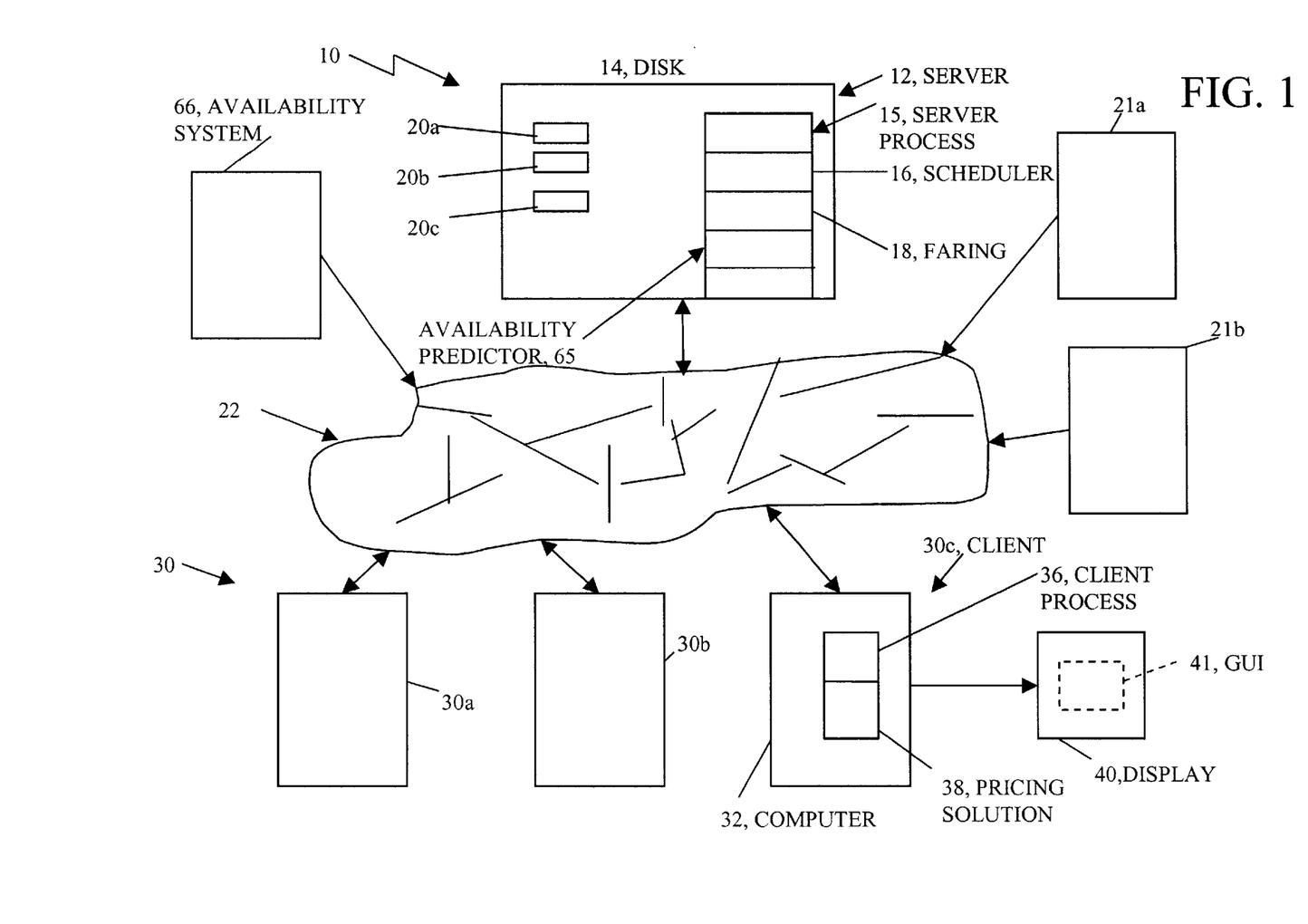
FIG. 1 is a block diagram of a client server travel planning system.

Referring now to FIG. 1, a travel planning system 10 is shown. The travel planning system 10 can be used with various forms of travel such as airline, bus and railroad and is particularly adapted for air travel. It includes a server computer 12 having a computer memory or storage media 14 storing a server process 15. The server process 15 includes a scheduler process 16 and a faring process 18. The scheduler process 16 is any scheduler process that will produce, from a travel request, sets of flights that can satisfy the request. The faring process 18 is any process that determines a set of valid fares. The server process 15 can also link a set of valid fares to flights to form a set of pricing solutions. Examples of the scheduler process 16 and the faring process 18 can be found in co-pending U.S. patent applications entitled "Scheduler System for Travel Planning System", Ser. No. 09/109,622, filed on Jul. 2, 1998 by Carl G. Demarcken et al., and U.S. patent application entitled "Travel Planning System", Ser. No. 09/109,327, filed on Jul. 2, 1998 by Carl G. Demarcken et al, both of which are assigned to the assignee of the present invention and incorporated herein by reference.

The travel planning system also includes a plurality of databases 20a, 20b which store industry standard information pertaining to travel, for example, airline, bus, railroad, etc. Database 20a can store flight information from a source such as the Standard Schedule Information Manual, whereas database 20b can store the Airline Traffic Publishing Company (ATPCO) database of published airline fares and their associated rules, routings and other provisions. The databases 20a, 20b are typically stored locally and updated periodically by the remote resources 21a, 21b. In addition, the system 10 can access an availability system 66 of one or more airlines (generally each airline will have its own availability system) by sending availability queries over the network 22.

The system 10 also includes an availability predictor 65. The availability predictor 65 can be based upon a cache or database of stored availability queries, a predictive model of availability and/or a simulation of an availability process or an actual availability process running as a local process to the server process 12.

The system 10 also includes a plurality of clients 30a–30c implemented by terminals or preferably personal computers. The clients are coupled to the server 12, via a network 22, that is also used to couple the remote resources 21a–21b that supply databases 20a, 20b to the server 12. The network 22 can be any local or wide area network or an arrangement such as the Internet. Clients 30a, 30b are preferably smart clients. That is, using client 30c as an illustrative example, it may include a client computer system 32 including computer memory or storage medium 34 that stores a client process 36 and a set of pricing solutions. The set of pricing solutions 38 in one embodiment is provided from the server process 15 and comprises a set of fares that are valid for a journey and associated information linking the fares to the flight segments of the journey. In an alternative arrangement, the availability predictor 65 can be part of the client process 36.

The set of pricing solutions 38 is obtained from the server 12 in response to a user request sent from the client to the server 12. The server 12 executes the server process 15 using the scheduling process 16 and the faring process 18 as mentioned in the above-identified patent applications to produce the set of pricing solutions for a particular journey. If requested by a client, the server process will deliver the set of pricing solutions to the requesting client. Under control of the client process 36, the requesting client 30c can store and/or logically manipulate the set of pricing solutions to extract or display a subset of the set of pricing solutions, as a display representation on the monitor 40.

Figure 2:
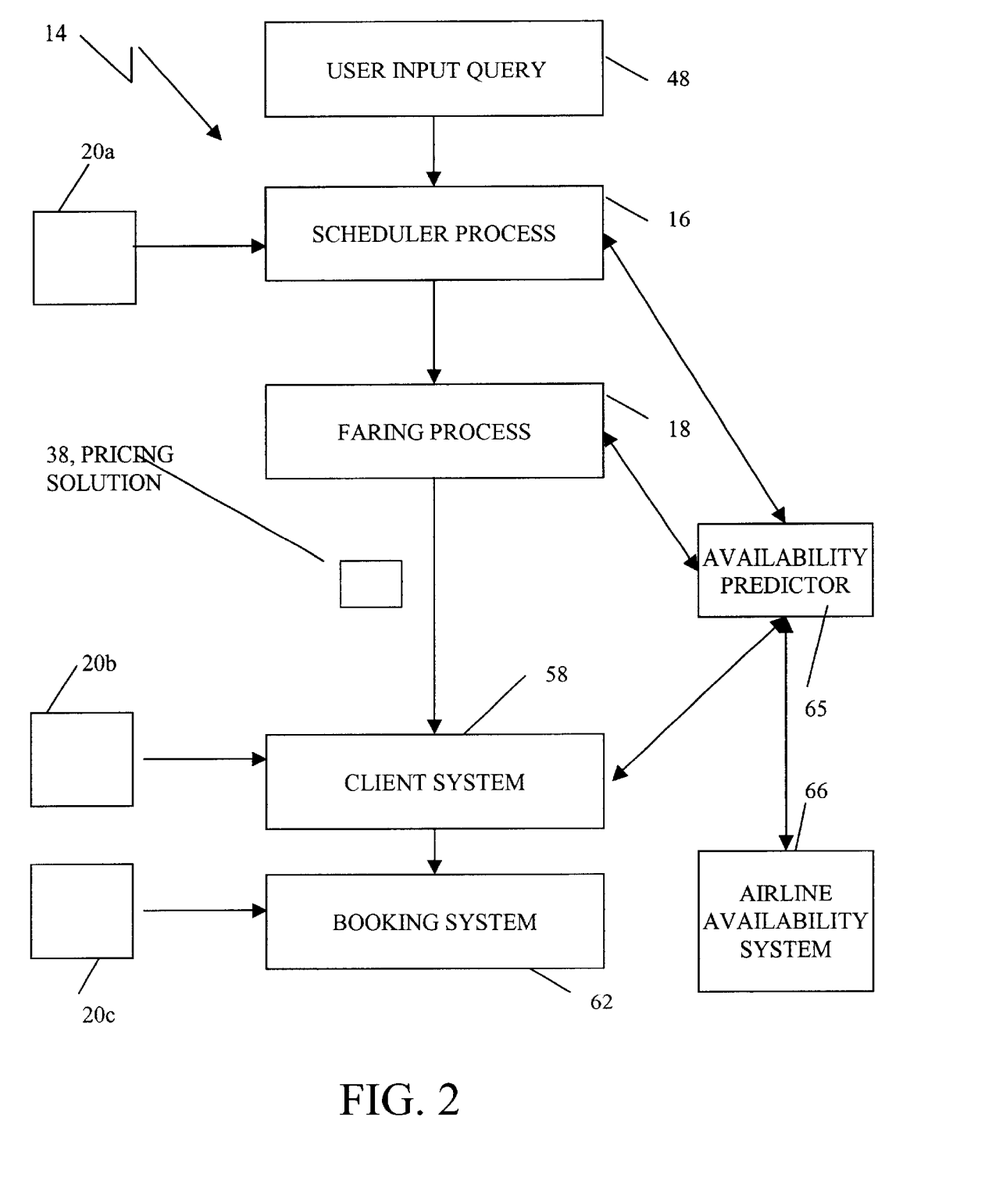
FIG. 2 is a flow chart showing a server process used in the system of FIG. 1.

Referring now to FIG. 2, the server process 18 is preferably executed on the server computer 12 but could be executed on the client 32. The server process 18 is responsive to a user input query 48. The user input query 48 would typically include minimal information needed to determine the set of pricing solutions. This information typically requires at a minimum an origin and a destination for travel. In addition, the information could also include times, dates and so forth. This query is fed to the scheduler process 16 that produces a large number of itineraries, that is, sequences of flight segments between the origin and destination of each slice of a journey. The scheduler process provides the itineraries to a faring process 18. The faring process provides a set of pricing solutions by finding valid fares corresponding to the itineraries produced by the scheduler process 16. The faring process 18 validates the fares for inclusion in the set of pricing solutions.

The server process 18 also includes an availability predictor 65 that is used to determine airline seat availability. The availability predictor 65 can be accessed after or during the scheduler process 16, faring process 18, or within the client system 58 to determine the availability of seats on a particular flight of a particular airline. The availability predictor 65 can be implemented using various techniques, as will be described below, which may include producing actual queries that are sent to an airline availability system 66. The answers received from the queries can be used to train the availability predictor 65. From the pricing solution information 38 and the availability information provided from the availability predictor 65, a client system or other system can access 58 a booking system 62 to issue a ticket for a customer.

Figure 3:
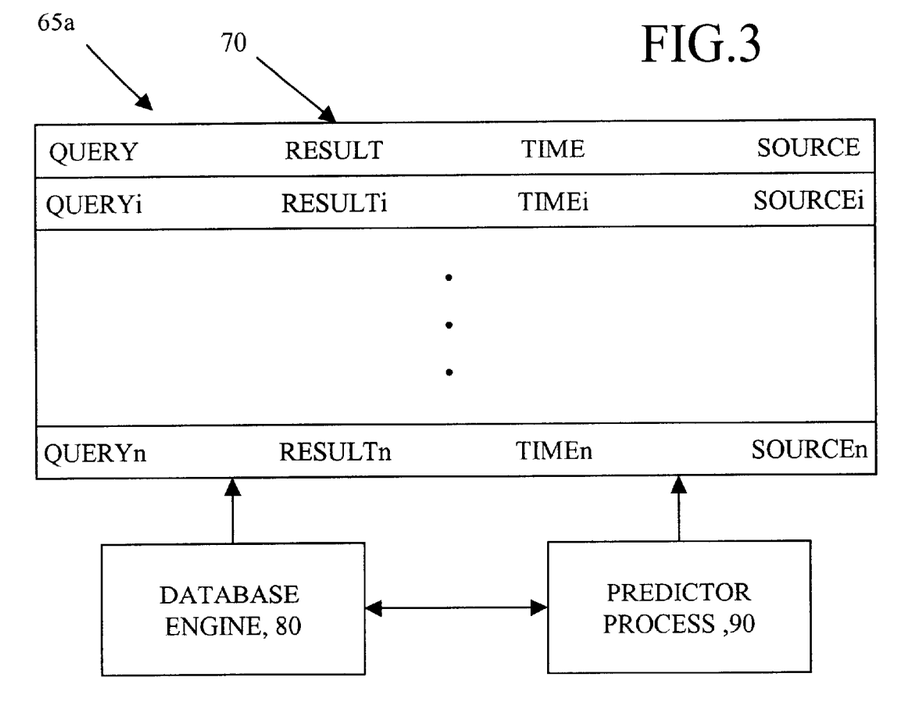
FIG. 3 is a block diagram of an availability database.

Referring now to FIG. 3, a first embodiment 65a of an availability predictor 65 includes a database 70, a database engine 80 and a predictor process 90. The database 70 stores availability queries and answers as shown. The database 70 includes queries and answers that were obtained by the availability predictor 65a when the availability predictor 65a could not trust or provide a prediction and thus issued an actual availability query, as well as, queries that are received from other sources. For example, the availability predictor can be run as part of a server process by a computer reservation service (CRS). The CRS may have access to availability queries that are run by travel agents, for example, that are associated with the computer reservation service. The queries and the results of these queries can be forwarded and stored in the database 70. The database 70 will contain the query such as shown below. For a query involving a single flight:

| Airl | Flt # | Orig | Dest | Date | TripOrigin | TripDest | SoldIn | SoldBy |
|------|-------|------|------|------|------------|----------|--------|--------|
| AA | 1822 | BOS | DEN | 25MAR99 | BOS | LAX | US | Amer. Expr. | or for a query involving multiple flights:

| Airl | Flt # | Orig | Dest | Date | TripOrigin | TripDest | SoldIn | SoldBy |
|------|-------|------|------|------|------------|----------|--------|--------|
| AA | 1822 | BOS | DEN | 25MAR99 | BOS | LAX | US | Amer. Expr. |
| AA | 0421 | DEN | LAX | 25MAR99 | BOS | LAX | US | Amer. Expr. |

A result will generally comprise a message such as shown below:

| Airl | Flt# | Orig | Dest | Date | BookingCodes&Counts |
|------|------|------|------|------|---------------------|
| AA | 1822 | BOS | DEN | 25MAR99 | F0 C0 Y9 M5 K5 L0 Q0 | or

| Airl | Flt# | Orig | Dest | Date | BookingCodes&Counts |
|------|------|------|------|------|---------------------|
| AA | 1822 | BOS | DEN | 25MAR99 | F0 C0 Y9 M5 K5 L0 Q0 |
| AA | 0421 | DEN | LAX | 25MAR99 | F1 C0 Y4 M5 K1 L1 Q1 |

Additional information can be stored in the database 70 which may typically be generated by the availability predictor 65a. For example, the query can be stored along with an entry that corresponds to the time and/or date that the query was stored, received, and/or generated. The source of the query can also be noted. In addition, other information may also be stored with the query such as characteristics of the customer or traveler. Such characteristics may include the traveler's nationality, point of purchase or status such as whether the traveler is a frequent flyer or whether the traveler is booking other flights on the airline to which the query was directed and so forth. The database 70 can also be populated by routine direct queries even in the absence of queries made to the predictor so that, when a question is asked of the predictor, it is less likely that a direct query would have to be made. For example, the database 70 may be populated during off peak times for travel agents or may be simply populated with such routine queries when the system is not otherwise in use.

The database engine 80 populates the database 70. The engine 80 can produce queries of certain types depending upon the relative factors involved in any particular flight and/or airline. Such routine queries could be automatically produced by the database engine 80 for those markets and/or flights in which air travel is particularly heavy or during such periods of time where air travel between particular origins and destinations would be particularly heavy.

Figure 4:
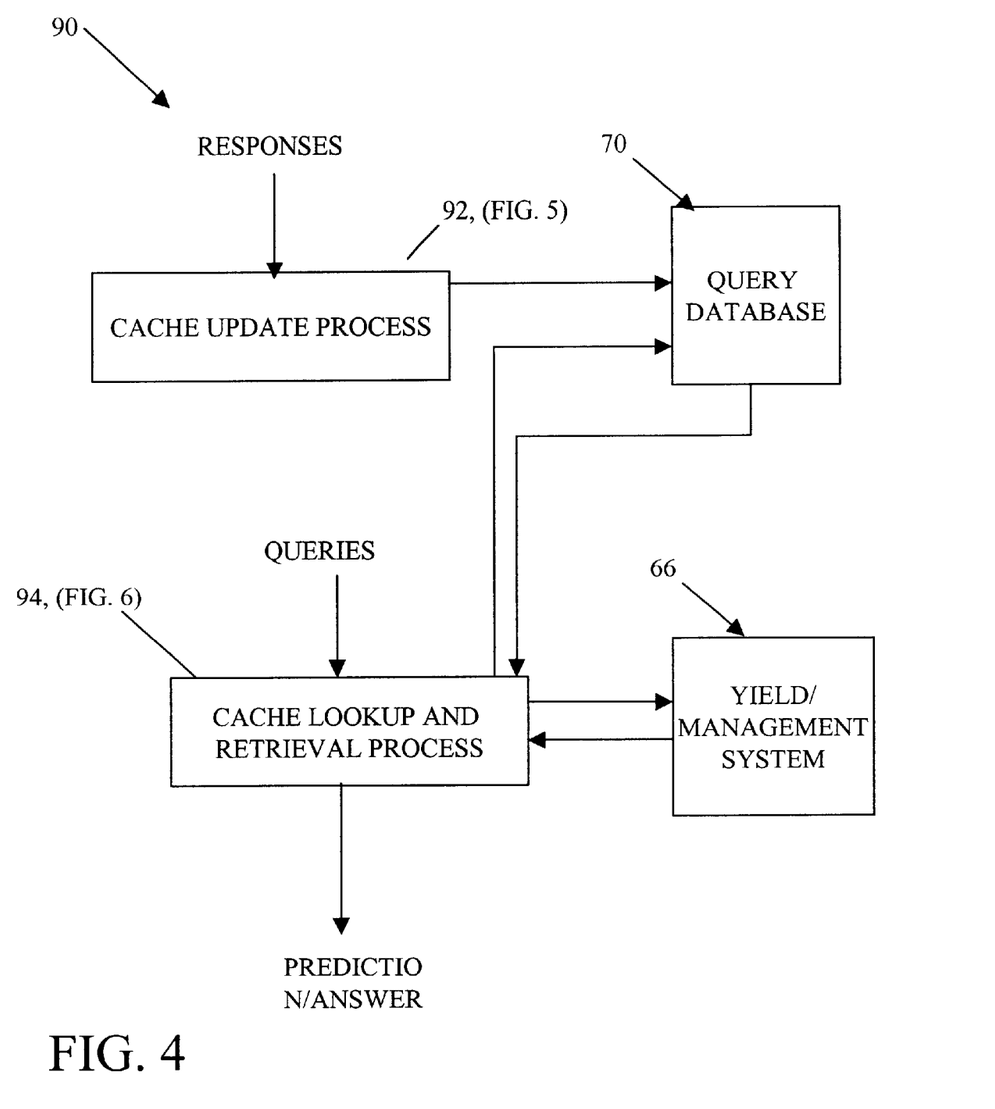
FIG. 4 is a block diagram of a predictor using the availability database of FIG. 4.

Referring now to FIG. 4, the predictor process 90 that uses the database 70 to provide predicted availability answers is shown. The predictor process 90 includes an update process 92 that interfaces with the query database 70 (FIG. 3) and database engine 80 to make sure that the query database 70 contains the most current information available for the availability predictor 90. The update process 92 takes responses that are received from queries made by the availability predictor 90, as well as other sources, and populates them into the query database 70 as appropriate. The predictor 90 also includes a look-up and retrieval process 94 that interfaces with the query database 70, as well as the yield management (availability) system 66 (FIG. 2) that is coupled in a conventional manner to an airline availability system. In response to a query, the look-up and retrieval process 94 produces either a prediction for the answer of the query or an actual answer depending upon whether the look-up and retrieval process retrieves an answer from the database 70 or the yield management system 66.

Figure 5:
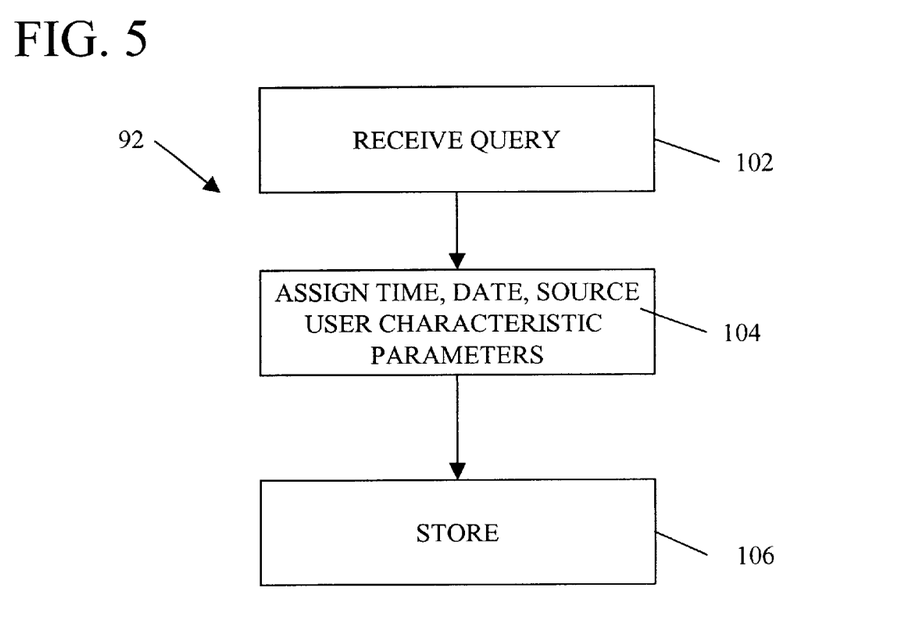
FIGS. 5 and 6 are flow charts of processes used with the availability database.

Referring now to FIG. 5, the update process 92 receives a query 102 from either the availability predictor 90 or from other sources, as described in conjunction with FIG. 3. The update process 92 assigns 104 a time, date, source, and user characteristic parameters, if available, as appropriate and stores 106 the query along with the answer and the assigned parameters in the query database 70.

Figure 6:
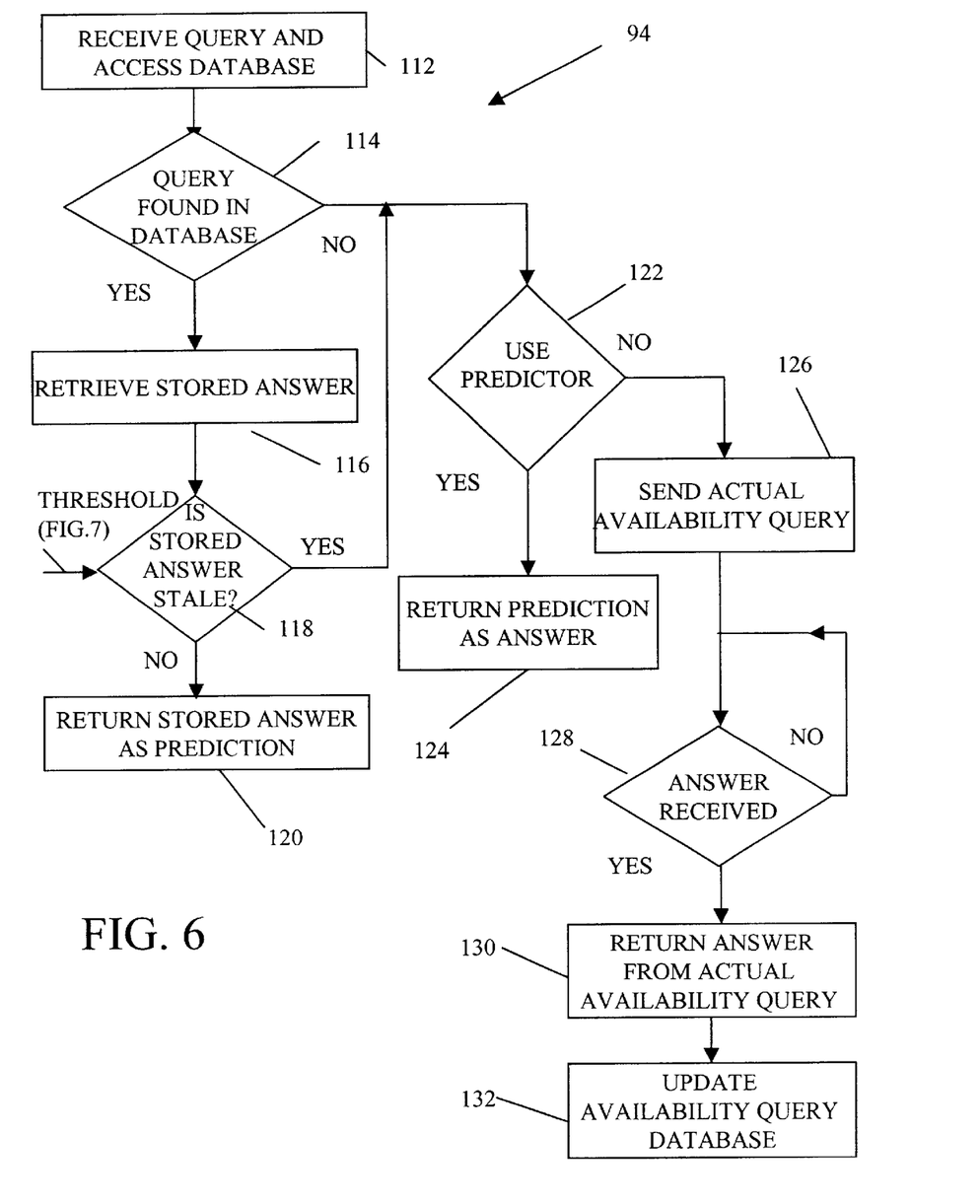

Referring now to FIG. 6, the look-up and retrieval process 94 receives a query that may have originated from the server process 15. The server process 15 may have a series of flights, fares and/or linked combinations thereof, for which availability information is needed. The server process 15 can construct an availability query for flight-segments it is using or considering using by collecting necessary information from the scheduling database 20a. The information can include airline, flight number or numbers, origin and destination airports, and travel date. In addition, the information can also include trip origin and destination if different than the origin and destination of the queried flight-segments. Queries may also include information about the selling location or agency. For travel involving multiple flight-segments, individual queries may be constructed for each flight segment, or a single query for multiple flight-segments might be constructed. The server process 15 sends the query to the availability predictor 65a.

Figure 7:
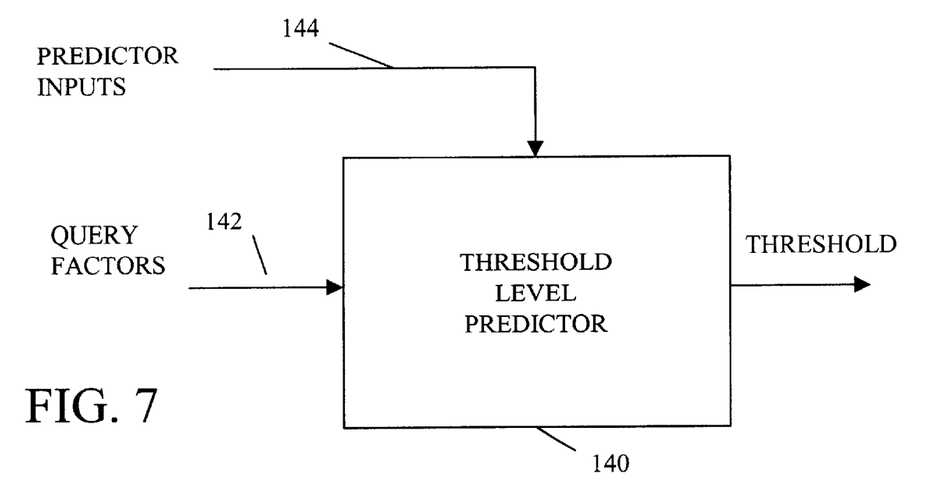
FIG. 7 is a block diagram of a threshold level predictor.

The look-up and retrieval process 94 will look up 112 the received query in the query database 70 by attempting to match the query fields such as airline, flight number/numbers, date, trip origin and destination, sale location and agency. If a stored query is found 114 in the query database 70 that matches the received query or which is substantially close in characteristics to the received query, the process 94 will retrieve 116 the stored answer. The process 94 will determine if the stored answer is stale 118 by comparing the time of the query to a threshold time that can be either a preset threshold such as a certain number of minutes, hours or days or preferably a variable threshold that is determined in accordance with a threshold level predictor 120 (FIG. 7). If the answer is not stale, then the look-up and retrieval process 94 will return 120 the stored answer as a prediction of the availability of a seat on a particular flight according to the availability query.

If the query was not found in the database 70 or if the stored query which was found is stale, the look-up and retrieval process 94 optionally can determine 122 whether or not to use another predictor such as one of the predictors to be described in conjunction with FIGS. 8–11. If the look-up and retrieval process 94 has this option, the process 94 will return 124 the prediction from those predictors, as the prediction from the availability predictor 65a. Otherwise, if the look-up and retrieval process 94 does not have a predictor or does not trust the predictor, then the process can send 126 an actual availability query to the airline availability system 66 (FIG. 2). The answer that is received 128 from the airline availability system 66 is returned 130 as the answer and can be used to update 130 the database 70. The database 70 can be implemented using various approaches including hierarchial, relational or object oriented databases, or alternatively, a software or hardware cache. In addition, the answer can include a confidence factor based on whether the query is stale or whether an actual query was performed.

Referring now to FIG. 7, a threshold level predictor 140 is shown. The threshold level predictor 140 can be fed by query factors 142 such as the date of a flight, origin and destination of the flight, size of the airplane and so forth and also fed by predictor inputs 144 that determine relative weights, for example, to assign to each one of the query factors. The threshold level predictor 140 can determine a threshold time interval that can change over time. The threshold level predictor 140 can be used by the look-up and retrieval process 94 to determine whether a stored query is stale. The threshold level predictor 140 can be a mechanism that models or predicts a rate at which seats are reserved on a particular airline given the inputs or the time that an airline adjusts parameters that affect how availability seats are distributed among various booking codes. The model can take into consideration historical rates at which flights or families of flights are sold on different dates, aircraft capacity, external events such as strikes or sales and so forth.

Figure 8:
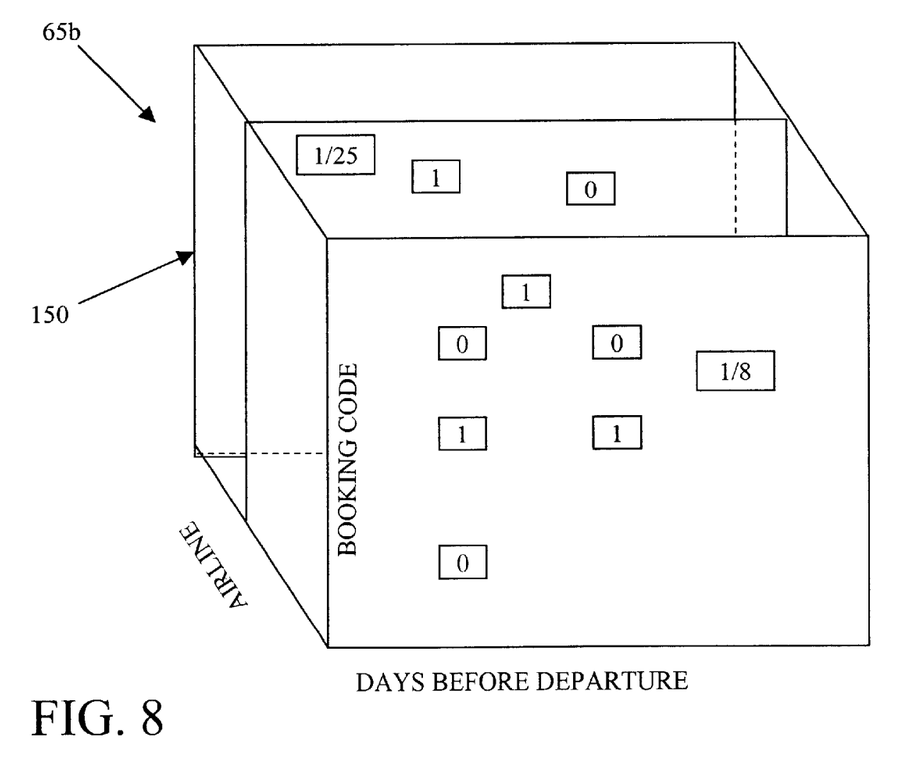
FIG. 8 is a block diagram of an availability table.

For a very simple example, the threshold predictor 140 could be a table similar to FIG. 8 that includes for every airline/booking-code/days-before-departure entry, a number of hours after which a database answer will be considered stale. This table could be trained on historical data by recording for each airline/booking-code/days-before-departure combination the average maximum number of hours prior to a query that other queries returned the same answer. For example, if in the past on American 3 days before departure in booking code Q, query answers remained the same for an average of 8 hours, then 8 hours would be stored in the table, and database queries for AA/Q/3-days-before-departure would be considered stale if they were more than 8 hours old.

Several options are provided for returning the predictions and/or answers from the look-up and retrieval process 94. For example, the look-up retrieval process 94 can simply return a true/false indication indicating that a seat conforming to the parameters of the query is available or is not available. Alternatively, the look-up and retrieval process 94 can return a probability estimate of availability of a seat conforming to the parameters of the query. In addition, the predictions can return a true/false indication or a probability on a booking code basis.

In addition to being populated with direct queries made by the availability predictor or queries that are obtained from other sources, additional types of query messages can also be used to populate the query database 70. For example, in many countries it is common for airlines to send out so-called "AVS" (available seat) messages which are distributed from certain airlines, particularly in foreign countries, to other airlines or computer reservation systems. AVS messages specify for a given flight segment whether there are seats remaining on that flight. Sometimes those messages can specify seating on a per booking code basis. Not all airlines use the AVS message process and, therefore, its use in the database would be limited to the availability of such messages for any particular flight segment and airline. Nevertheless, this could be an additional mechanism used to improve the data that is stored in the query database.

Referring now to FIG. 8, a table predictor 65c is shown. The table predictor 65c can be in the form of a three-dimensional table that is stored in computer memory. This is only an example. The table does not have to be three dimensional, and the axes could be different features of an availability query. The table can be indexed by any number of the features of the query. In this example, the table can correspond to the following: the X axis can be a time axis specifying days or hours before departure, the Y axis can be airlines and the Z axis can be booking codes.

The table 150 could have 0's or 1's entries 152 corresponding to not available/available. Alternatively, these entries 152 could also be probability estimates (not shown). This table 150 could be populated by historical information about how often booking codes were available in the past for the airline/booking-code/days-before-departure. For example, if over the past few months availability queries for AA flight 66 that were sent 3 days in advance of travel had booking code Q available 80% of the time, then the probability 0.8 could be stored in the table. When using the predictor 65b, 0.8 could be returned for AA/3day/Q queries, or if an available/not-available answer was desired, "available" could be answered because 0.8> 0.5. In addition, the table could also be populated with the number of seats 154 that might be available on a booking code basis. This can be determined from historical information. The table predictor may also store a number that corresponds to the number of actual queries that were used to arrive at the probability estimate. This number can be used to produce a confidence factor that is returned with the predictor.

Figure 9:
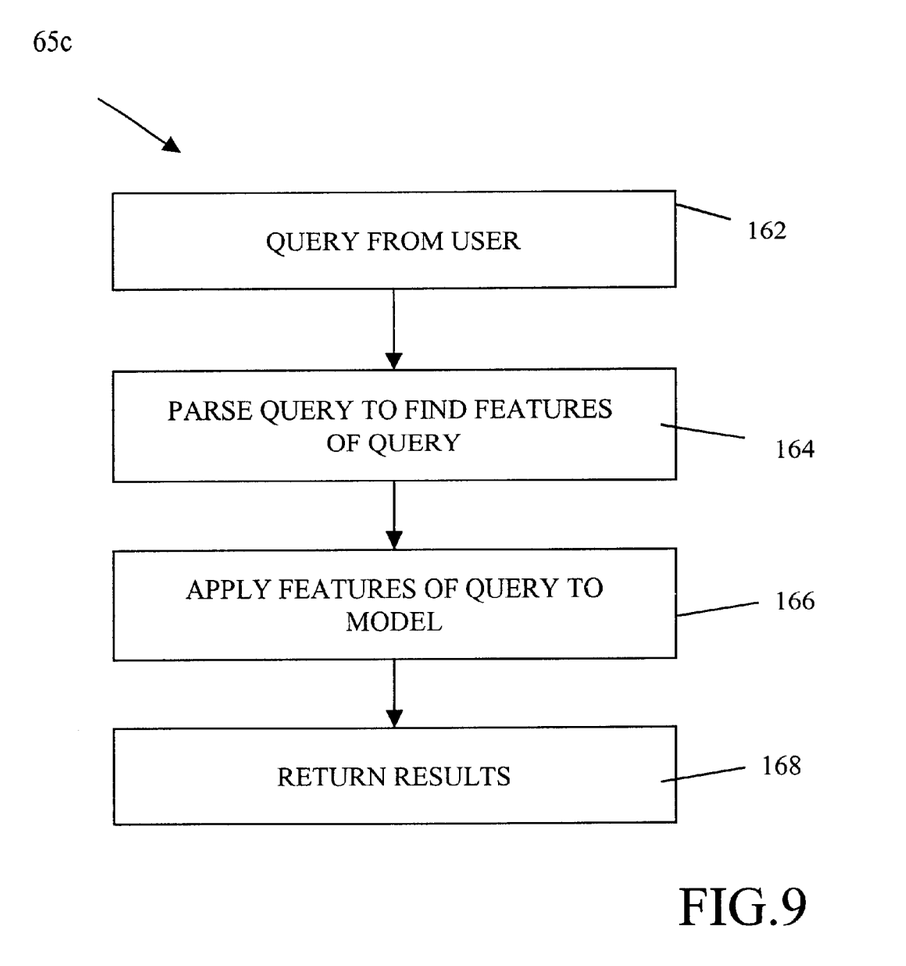
FIG. 9 is a block diagram of an availability predictor.
Figure 9A:
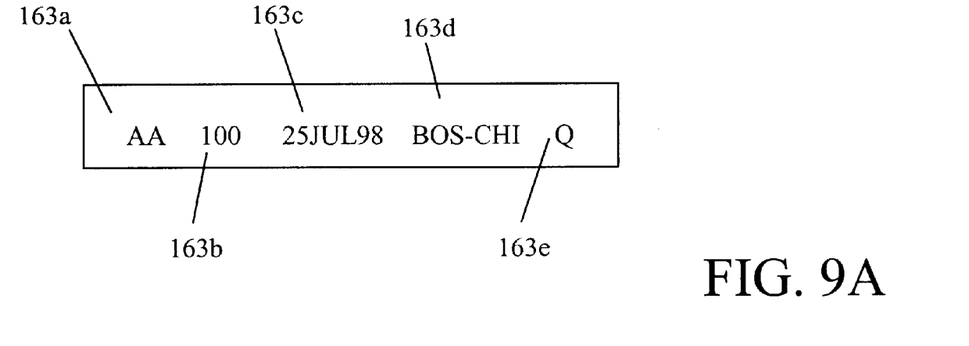
FIG. 9A is a diagram showing an exemplary query.

Referring now to FIG. 9, a model-based predictor embodiment 65c of the availability predictor 65 is shown. The model-based availability predictor 65c receives 122 a query from a user. The query 163, as shown in FIG. 9A, includes information including an airline 163a, a flight number 163b, a date 163c, an origin and destination (or city pair) 163d, as well as, one or more booking codes 163e. In addition, the query 163 may include other information including point of sale, sales agent, possibly multiple flight numbers, possibly a trip origin and trip destination (as opposed to just the origin/destination of the flights being queried). The query 163 is parsed and analyzed 164 by the model-based availability predictor 65c to find features or characteristics of the query 163. That is, the query 163 is broken down to features such as flight number type, period of flight, origin and destination types, the length of time before the flight departs, travel times in the query, and so forth. In addition, the aircraft and capacity, as well as, external events such as sales and strikes, historical availability, and traffic on other flights properties of the traveler and so forth.

For a sample query 163 "UA 100 25JUL98 BOS-CHI Q", the availability predictor can parse 164 that into the following information: the query 163 is for a United Airlines flight, a major carrier, having a flight number 100, a "low number flight", that the date of the flight is in "the summer", and that the flight is between "two major" cities. The query can determine that the requested fare is a "low cost" fare for Q booking code. In addition, although not present in this query, other factors could also be present in a typical availability query. For example, if the booking code was Y that would indicate a high cost fare. If the flight number is 7500, that could indicate a high flight number and if the origin and destination were "DLH-HIB" (Duluth to Hibbing), that could indicate a flight between two small cities.

Among the features that the availability predictor 65c may take into account are entries in a database of recent or historical fares such as database 70 (FIG. 3). Two features of a query may be "is there a query in the database 70 (FIG. 3) for a similar flight on the same day where the booking code is available" or "is there a query in the database for the same flight on the same day where the booking code is available." The answers in the database 70 (FIG. 3) may be too old to return as an answer, but the information may still be useful in the statistical predictor 65c. This is noted in FIGS. 6 and 10 by the paths between the database and the predictor.

The availability predictor 65c applies 166 the positive, that is, present features of the query to a model and the model returns 168 a prediction of availability corresponding to the query. The results that could be returned from the query may be, for example, a simple "yes", "no", i.e, 1,0 binary return, which indicates either a seat is available or not available or, alternatively, the model may return a number which is or can represent a probability that a seat is available or not available.

Figure 10A:
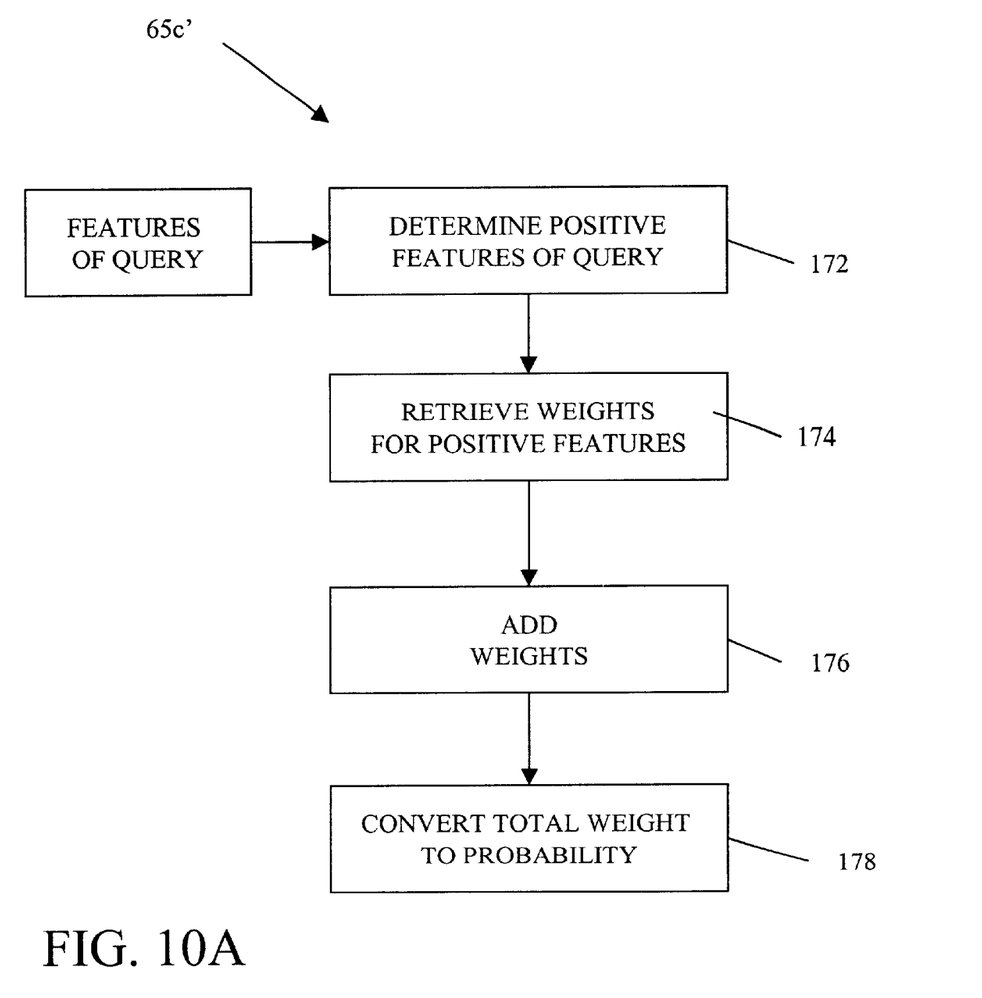
FIG. 10A is a block diagram of an availability predictor of FIG. 3 using an exponential modeling algorithm.

Referring now to FIG. 10A, one embodiment 65c' of the model-based availability predictor 65c is shown. The predictor 65c' determines 172 positive features of the query. The predictor 65c' retrieves 174 weights for the positive features with the weights either set in accordance with expert understanding of airline's availability, or, automatically from historical data. In this case, algorithms for setting the weights can be found in various statistics and "machine learning" textbooks such as "Neural Networks for Pattern Recognition" by Christopher Bishop, Oxford Press.

One such algorithm is called "gradient descent" and is approximately as follows:

1. For each feature F, set its weight W(F) to 1.
2. Calculate for each feature F the number of historical queries that returned "available" that the feature occurred in, and call it H(F). (For example, if an American Airlines feature (AA) occurred in 200 queries that were available, then let H(AA)=200).
3. Using the current weights, calculate for each historical query H the probability P(H) of it being available, using the same equations used for normally predicting availability: P(H)=exp(X)/(1+exp(X)) where X=sum W(F) for all features F in H.
4. For each feature F, calculate the number of times the current model predicts it will occur in available queries, M(F), by summing P(H) over each historical query H that includes the feature F.
5. Calculate for each feature F the difference between the known number of times the feature appeared in historical queries, H(F), and the predicted number, M(F), and if for each feature the difference is less than a threshold, stop training and use the current weights.
6. Otherwise, update each feature F's weight W(F) using the formula W(F)←W(F)+K*(H(F)−M(F)) where K is some small constant like 0.01.
7. Go to 3 until all weights have been determined.

The availability predictor 65c' assigns the weights to the positive factors and adds 176 them to produce a total weight number. The total weight is converted 178 to a total probability. One technique to convert the weight sum to a total probability uses an exponential model of the form $e^x/(1+e^x)$, where x is the total weight number. Alternative models include a linear or quadratic discriminator, factorial model, decision tree, decision list, neural network, sigmoidal network, Bayesian network, naive Bayesian network, Markov random field, maximum entropy model, exponential or log linear model, nearest neighbor model, radial basis model or support vector model and so forth. All of these other models assume that there are features, but not necessarily that the features have weights that are summed.

Figure 10B:
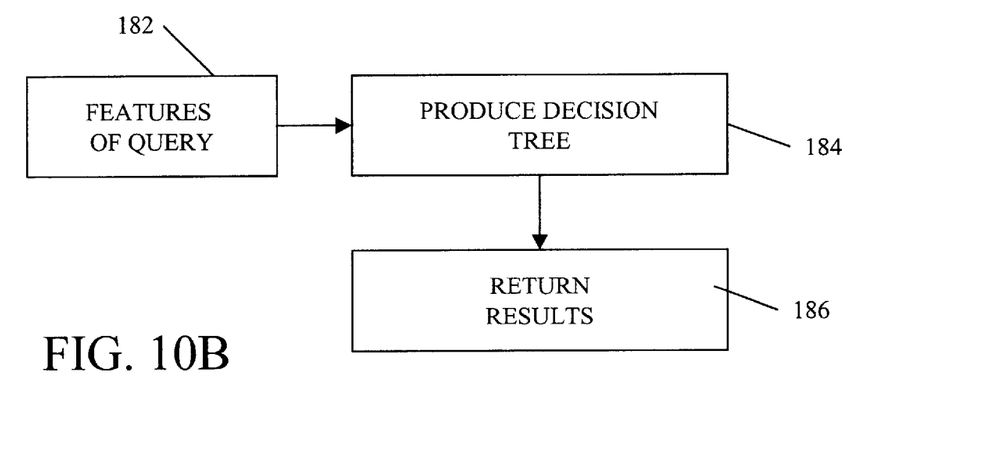
FIG. 10B is a block diagram of an availability predictor using a decision tree algorithm.

Referring now to FIG. 10B, an alternative embodiment 65c'' of the model-based availability predictor 65c (FIG. 8) takes 182 features of the query and uses 184 a decision tree to evaluate the query. From the decision tree, a predicted answer to the query is returned 186. A decision tree is another type of classifier, already listed above. As weights are computed ahead of time in the exponential model the "decision tree" is built ahead of time from historical data. The decision tree is used to predict by following branches appropriate for a given query's features and then returning the probability/answer found at the leaf of that the tree the branches lead to. The decision tree is built from historical data.

Figure 11:
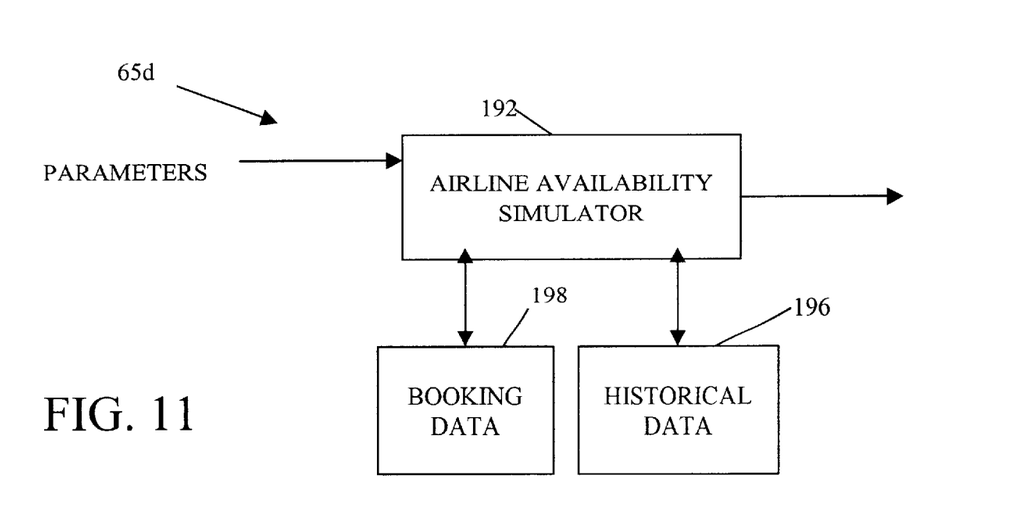
FIG. 11 is a block diagram of an availability predictor that simulates an airline availability system.

Referring now to FIG. 11, an alternative mechanism 65d for an availability predictor 65 includes an airline availability processing system simulator 192. As mentioned previously, generally airlines have an availability system 66 (FIG. 1) that depends upon various considerations as to whether or not an airline will indicate that a seat is available in response to a given query. The airline availability system implements an airline's complex selling policy in order to maximize profit on a given flight.

The simulator 192 can follow the same considerations that the airline uses in determining whether or not a seat is available for a given flight. The simulator 192 can be constructed by making use of parameters provided by airlines or estimated independently of the airline on the basis of direct available queries or predicted from external factors such as dates, passengers, traffic flow and so forth. These parameters can include parameters that control the allocation of empty seats amongst various booking codes, as well as databases of actual flight capacities and reservation counts. In an alternative arrangement, an airline may provide the availability system that can run as a local process within the server process 15 to produce actual availability answers without the need for transmitting messages over the computer network 22.

The simulator 192 can be the actual yield management program used by an airline or more likely would be a program that is constructed to model the yield management system used by the airline. The simulator 192 can use historical data 196, i.e., historical direct queries and answers, as well as current bookings 198. The airline may, on a regular or per query basis, provide to the simulator 192 information about any parameters that the airline uses to control the responses to availability queries including, for example, the expected profit margins for booking codes, expected rate at which seats on flights are sold at or will be reserved for, and the number of seats currently reserved or sold on individual flights. These parameters may be estimated by the predictor on a regular or per query basis, based on answers to previous direct queries or knowledge of external factors such as the query time and date, the flight time and date, airline sales or other promotional activities, strikes or service outages on the airline, or other airlines and so forth.

This process would be useful since, rather than having an airline transmit parameters to the predictor over a computer network which may be time consuming and expensive, it may be desirable that the airline provide information or in fact the actual yield management system directly to the availability predictor such that the process can be simplified and made more efficient.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer program product residing on a computer readable medium comprises instructions for causing a computer to:
   produce a prediction of how an availability system that includes a revenue management algorithm and inventory management system would respond to an availability query that requests availability of a seat for a mode of transportation in accordance with the availability query, with the query including one of more fields that specify at least one of points of travel, dates of travel, times of travel, class of travel, or booking code.

2. The computer program product of claim 1 wherein instructions that cause the computer to provide a prediction of availability system response comprise instructions to cause the computer to:
   access a database of stored query results to produce a prediction of availability response in response to the query.

3. The computer program product of claim 2 wherein instructions that cause the computer to access the database further comprise instructions that cause a computer to:
   receive the availability query and determine whether the availability query corresponds to or is similar to a query stored in the database; and
   retrieve a stored answer associated with a query stored in the database that corresponds to or is similar to the availability query or otherwise send an actual availability query to the airline reservation system.

4. The computer program product of claim 3 wherein instructions that cause the computer to access the database further comprise instructions for causing the computer to:
   determine whether the retrieved, stored answer is stale and, if the retrieved stored answer is stale,
   send an actual availability query to an availability system; and
   if the retrieved, stored answer is not stale, return the retrieved, stored answer as the prediction of how an availability system would respond to the availability query.

5. The computer program product of claim 4 wherein instructions that cause the computer to access the database further comprise instructions for causing a computer to:
   use a model-based predictor to provide a prediction of how an availability system would respond to an availibility query if there is no availability query found in the database.

6. The computer program product of claim 1 wherein the predictor comprises instructions for causing the computer to:
   parse the availability query to produce a set of features for use by an availability model.

7. The computer program product of claim 1 wherein the instructions that cause the computer to produce a prediction of how an availability system would respond to an availability query comprise instructions for causing the computer to:
   determine features of the availability query; and
   apply the determined features of the query to an availability model.

8. The computer program product of claim 7 wherein the availability model is a statistical or deterministic classifier that is trained using historical data based on answers obtained form other availability queries.

9. The computer program product of claim 8 wherein the statistical or deterministic classifier is a linear or quadratic discriminator, factorial model, decision tree, decision list, neural network, sigmoidal network, Bayesian network, naive Bayesian network, Markov random field, maximum entropy model, exponential or log linear model, nearest neighbor model, radial basis model or support vector model.

10. The computer program product of claim 1 wherein instructions that cause the computer to produce a prediction of how an availability system will response to a query for availability comprise instructions that cause a computer to simulate an airline's availability system.

11. The computer program product of claim 1 wherein instructions that cause the computer to produce a prediction of how an availability system will respond to a query for availability comprise instructions to cause the computer to:
   access a database that has probability estimates stored as a function of booking codes.

12. The computer program product of claim 11 wherein the database that has probability estimates stored as a function of booking codes further has probability estimates stored as a function of booking codes, time before departure, and airline.

13. The computer program product of claim 1 wherein instructions that cause the computer to produce a prediction of how an availability system will respond to a query for availability comprise instructions that cause a computer to:

access a database that has true/false indications stored as a function of booking codes.

14. The computer program product of claim 13 wherein the true/false indications are further stored as functions of booking codes, time before departure, and airline.

15. The computer program product of claim 1 wherein the prediction includes a number of seats that are available.

16. The computer program product of claim 1 wherein the prediction includes a number of seats that are available on a booking code basis.

17. The computer program product of claim 1 wherein the prediction includes a confidence factor indicating how likely it is that the prediction is correct.

18. A method for providing availability information for a seat on an airline, comprises:

producing a prediction of how an availability system that includes a revenue management algorithm an inventory management system would respond to an availability query for availability of the seat in accordance with the availability query, the query including one or more fields that specify at least one of points of travel, dates of travel, times of travel, class of travel, or booking code.

19. The method of claim 18 wherein producing further comprises:

accessing a database of stored query results to produce the prediction.

20. The method of claim 19 further comprising:

receiving the availability query; and determining whether the availability query corresponds to or is similar to a query stored in the database; and retrieving a stored answer associated with a query stored in the database that corresponds to or is similar to availability query or otherwise send an actual availability query to the availability system.

21. The method of claim 19 further comprising:

determining whether the retrieved, stored answer is stale and, if the retrieved stored answer is stale, sending an actual availability query to the airline, and if the retrieved, stored answer is not stale, returning the retrieved, stored answer as the prediction.

22. The method of claim 18 wherein providing a prediction of how an availability system will respond to a query for availability further comprises:

sending the query to a model-based predictor of how an availability system will respond to a query to provide the answer to the query as a predicted answer.

23. The method of claim 22 further comprising:

parsing the availability query to produce a set of features for use by the model-based predictor; and applying selected ones of the set of features of the query to the model-based predictor.

24. The method of claim 18 wherein the model-based predictor is a statistical or deterministic classifier.

25. The method of claim 18 wherein providing a predicted availability answer comprises:

simulating an airline's availability system.

26. The method of claim 18 wherein providing a prediction of availability comprises:

accessing a database that has probability estimates stored as a function of booking codes.

27. A system for producing an availability answer in response to a query, the query including one or more fields that specify at least one of points of travel, dates of travel, times of travel, class of travel, or booking code for airline seat availability information, comprises:

a predictor that is responsive to the query and produces an answer that corresponds to a prediction of how an airline availability system that includes a revenue management algorithm and inventory management system would answer the query for airline seat availability.

* * * * *